(12) United States Patent
Yadgiri et al.

(10) Patent No.: US 10,268,838 B2
(45) Date of Patent: Apr. 23, 2019

(54) CONSENT HANDLING DURING DATA HARVESTING

(71) Applicant: SAP SE, Walldorf (DE)

(72) Inventors: Ashwin S. Yadgiri, Vijayawada (IN); Ranjit Alapati, Vijayawada (IN)

(73) Assignee: SAP SE, Walldorf (DE)

( * ) Notice: Subject to any disclaimer, the term of this patent is extended or adjusted under 35 U.S.C. 154(b) by 569 days.

(21) Appl. No.: 14/944,407

(22) Filed: Nov. 18, 2015

(65) Prior Publication Data
US 2017/0098100 A1  Apr. 6, 2017

(30) Foreign Application Priority Data

Oct. 6, 2015 (IN) .......................... 5334/CHE/2015

(51) Int. Cl.
*G06F 21/62* (2013.01)
*G06F 17/30* (2006.01)

(52) U.S. Cl.
CPC .... *G06F 21/6254* (2013.01); *G06F 17/30867* (2013.01)

(58) Field of Classification Search
CPC ........................ G06F 21/6254; G06F 17/30867
See application file for complete search history.

(56) References Cited

U.S. PATENT DOCUMENTS

| | | | | |
|---|---|---|---|---|
| 6,253,203 B1* | 6/2001 | O'Flaherty | ......... | G06F 21/6245 |
| 7,188,252 B1 | 3/2007 | Dunn | | |
| 8,185,931 B1* | 5/2012 | Reeves | ............... | G06F 21/6263 |
| | | | | 707/694 |
| 8,291,016 B1 | 10/2012 | Whitney et al. | | |
| 8,544,104 B2* | 9/2013 | Burke | ................. | G06F 21/6245 |
| | | | | 726/26 |
| 8,719,366 B2 | 5/2014 | Mathew et al. | | |
| 8,826,446 B1* | 9/2014 | Liu | ..................... | G06F 21/6245 |
| | | | | 726/1 |
| 9,015,301 B2* | 4/2015 | Redlich | ................. | G06Q 10/10 |
| | | | | 707/609 |
| 9,262,517 B2* | 2/2016 | Feng | ................... | G06F 17/3071 |

(Continued)

OTHER PUBLICATIONS

"Datasift and Facebook," PYLON for Facebook Topic Data FAQ, datasift.com/products/pylon-for-facebook-topic-data/faq/#data.privacy, retrieved Aug. 7, 2015, pp. 1-4.

(Continued)

*Primary Examiner* — Eleni A Shiferaw
*Assistant Examiner* — Hee K Song
(74) *Attorney, Agent, or Firm* — Klarquist Sparkman, LLP

(57) ABSTRACT

The described technologies can be used for consent handling during data harvesting. In one example, a method can include receiving social media data associated with a user identifier and a first country code. A stored consent configuration rule can specify whether to store the social media data anonymously or non-anonymously. The consent configuration rule can be associated with a second country code. It can be determined whether the second country code associated with the consent configuration rule matches the first country code associated with the social media data. When the second country code associated with the consent configuration rule does not match the first country code associated with the social media data, the social media data can be stored in a quarantine.

18 Claims, 8 Drawing Sheets

(56) References Cited

U.S. PATENT DOCUMENTS

| | | | |
|---|---|---|---|
| 9,288,184 B1* | 3/2016 | Kvamme | H04L 63/0227 |
| 9,396,253 B2* | 7/2016 | Porpora | G06F 17/30699 |
| 9,507,960 B2* | 11/2016 | Bell | G06F 21/6245 |
| 9,621,357 B2* | 4/2017 | Williams | H04L 9/006 |
| 9,633,115 B2* | 4/2017 | Byrne | G06F 17/30864 |
| 2009/0132365 A1 | 5/2009 | Gruenhagen et al. | |
| 2011/0029636 A1* | 2/2011 | Smyth | G06F 17/3089 |
| | | | 709/217 |
| 2011/0178995 A1* | 7/2011 | Suchter | G06F 17/30864 |
| | | | 707/692 |
| 2011/0270872 A1* | 11/2011 | Alvarez | G06Q 10/06 |
| | | | 707/769 |
| 2012/0041939 A1* | 2/2012 | Amsterdamski | |
| | | | G06F 17/30867 |
| | | | 707/709 |
| 2013/0024532 A1* | 1/2013 | Lee | G06Q 50/01 |
| | | | 709/206 |
| 2013/0166597 A1 | 6/2013 | Khan et al. | |
| 2013/0262168 A1 | 10/2013 | Makanawala et al. | |
| 2013/0269035 A1* | 10/2013 | Bajaj | G06Q 10/00 |
| | | | 726/26 |
| 2013/0326578 A1* | 12/2013 | Blom | G06F 21/6218 |
| | | | 726/1 |
| 2014/0032259 A1* | 1/2014 | LaFever | G06Q 30/0201 |
| | | | 705/7.29 |
| 2014/0041055 A1* | 2/2014 | Shaffer | G06Q 10/10 |
| | | | 726/28 |
| 2014/0047551 A1* | 2/2014 | Nagasundaram | G06F 21/60 |
| | | | 726/26 |
| 2014/0067535 A1* | 3/2014 | Rezaei | G06F 17/30598 |
| | | | 705/14.54 |
| 2014/0373182 A1* | 12/2014 | Peri | G06F 21/6245 |
| | | | 726/30 |
| 2015/0128285 A1* | 5/2015 | LaFever | H04L 67/02 |
| | | | 726/26 |
| 2016/0004769 A1* | 1/2016 | Gukal | G06F 17/30696 |
| | | | 707/730 |
| 2016/0050272 A1* | 2/2016 | Raduchel | H04L 67/1095 |
| | | | 709/204 |
| 2016/0127289 A1* | 5/2016 | Papa | H04L 51/12 |
| | | | 709/206 |
| 2016/0371684 A1* | 12/2016 | Abbott | G06Q 20/38215 |
| 2017/0249389 A1* | 8/2017 | Brovinsky | G06Q 30/02 |

OTHER PUBLICATIONS

"Protection of personal data—European Commission," Justice, ec/europa.eu/justice/data-protection/index_en.htm, retrieved Aug. 7, 2015, pp. 1-3.

"Valuable insights from Facebook without comprising consumer trust," PYLON for Facebook Topic Data, datasift.com/products/pylon-for-facebook-topic-data/, retrieved Aug. 7, 2015, pp. 1-5.

Catanese et al., "Crawling Facebook for Social Network Analysis Purposes," *Proceedings of the international conference on web intelligence, mining and semantics*. ACM, 2011, 8 pages.

Dorazio, "Why Facebook Topic Data is a Big Deal for the Marketing Industry," blog.datasift.com/2015/03/25/why-facebook-topic-data-is-a-big-deal-for-the-marketing-industry/, retrieved Aug. 7, 2015, pp. 1-6.

Handbook on European data protection law, European Union Agency for Fundamental Rights, 2014, 203 pages.

* cited by examiner

CONSENT HANDLING DURING DATA HARVESTING

CROSS-REFERENCE TO RELATED APPLICATIONS

This application claims the benefit of Indian Provisional Application No. 5334/CHE/2015, entitled "CONSENT HANDLING DURING DATA HARVESTING," filed Oct. 6, 2015, the entire disclosure of which is incorporated herein by reference in its entirety.

BACKGROUND

A manufacturer or provider of services can potentially gain insights into consumer sentiment by monitoring user-generated data posted to social media platforms. For example, consumers may use various social media platforms to discuss products and services that the consumers have purchased or are considering purchasing. In particular, a customer may reveal his or her sentiments by posting information praising an innovative and well-designed product or criticizing a poorly designed or manufactured product. A business may enhance its insights by taking into account the sentiments of multiple consumers, such as by aggregating the sentiments of multiple consumers from one or more social media websites. For example, various statistical tools can be used to detect trends and/or distributions in sentiment. However, data privacy laws may limit the content and type of data that can be stored during data harvesting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method can include receiving social media data associated with a user identifier and a first country code. A stored consent configuration rule can specify whether to store the social media data anonymously or non-anonymously. The consent configuration rule can be associated with a second country code. It can be determined whether the second country code associated with the consent configuration rule matches the first country code associated with the social media data. When the second country code associated with the consent configuration rule does not match the first country code associated with the social media data the social media data can be stored in a quarantine. When the second country code associated with the consent configuration rule matches the first country code associated with the social media data, the social media data can be stored according to the consent configuration rule.

In one embodiment, a method can include harvesting social media data to generate harvested social media data. The harvested social media data can include a social media channel and a country code. A plurality of consent rules can be stored. A respective consent rule of the plurality of consent rules can specify a format for storing data associated with at least a respective country code or a respective social media channel. The method can include determining whether there is a matching consent rule of the plurality of consent rules corresponding to the social media channel or the country code of the harvested social media data. When there is a matching consent rule, the harvested social media data can be stored in the format specified by the matching consent rule of the plurality of consent rules. When there is no matching consent rule, the harvested social media data can be stored in a locked format so that user sentiment is not retrievable until a matching consent rule is created.

In one embodiment, a system can be used for consent handling during data harvesting. The system can include a data harvester for collecting social media data The collected social media data can include one or more fields representative of a user identifier, a country code, or a social media channel. The system can include a first storage device for storing a plurality of consent rules. A respective consent rule can be for matching a value of a given field of the collected social media data to a format for storing the social media data. The system can include a non-quarantine storage device and a quarantine storage device for storing collected social media data. The quarantine storage device can be physically separate from the non-quarantine storage device. The system can include a database system in communication with the data harvester and the storage devices. The database system can be configured to determine whether any of the plurality of consent rules match the value of the given field of the collected social media data. When there is a match, the collected social media data can be stored on the non-quarantine storage device in the format of the matching consent rule. When there is no match, the collected social media data can be stored on the quarantine storage device.

The foregoing and other objects, features, and advantages of the invention will become more apparent from the following detailed description, which proceeds with reference to the accompanying figures.

DETAILED DESCRIPTION

Overview

Figure 1:
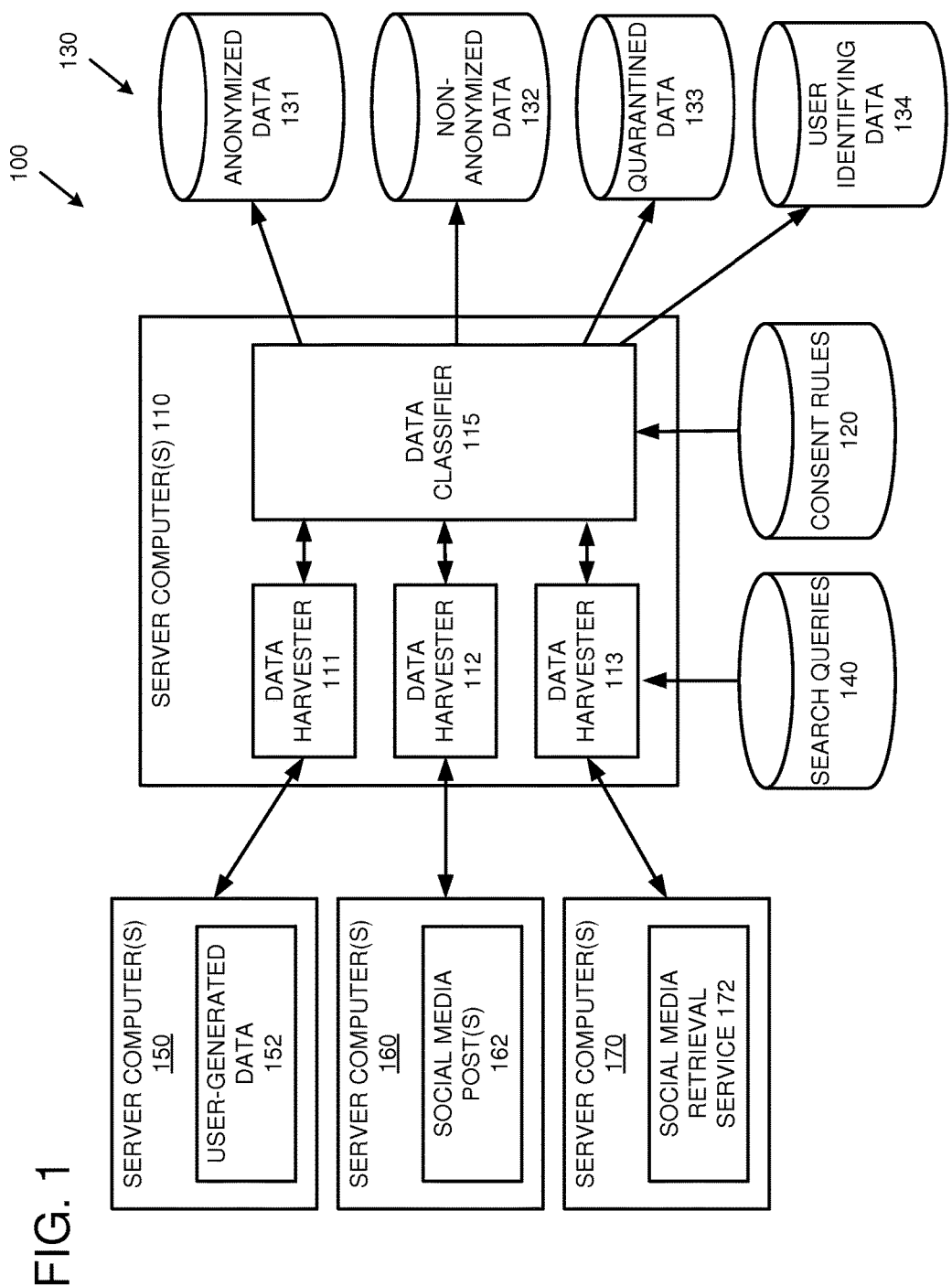
FIG. 1 is a block diagram of an example system implementing consent handling during data harvesting.

Social media analytics can include analyzing user-generated data, such as social media data, to make business decisions. For example, a search term, such as a product name, can be specified and social media data containing the search term can be collected or harvested for further analysis. The social media data can be collected by crawling pages of various social media websites and/or by using a social media retrieval service, such as DATASIFT or GNIP. Social media platforms can include websites and/or applications that allow individuals and/or communities of individuals to create and share information. Social media websites can include FACEBOOK, TWITTER, TUMBLR, REDDIT, PINTEREST, FLICKR, GOOGLE+, INSTAGRAM, YOU-TUBE, YELP, IMDB, LINKEDIN, TOPIX, and DAILY- MOTION, for example. User-generated data can also be gathered from blogging sites and WIKIPEDIA, for example.

The collected user-generated data can be analyzed as it is collected and/or stored for analysis at a later time. However, the collection, storage, and/or analysis of user-generated data may be subject to different laws depending on where the data is generated, collected, and/or stored. For example, a first set of countries may not have any restrictions on using harvested data that contains personally-identifying information. A second set of countries may allow the use of harvested data where the user is anonymized or separated from the data to be analyzed. A third set of countries may require that a user's consent be obtained before using harvested data that contains personally-identifying information. The required consent can be obtained indirectly, such as via a licensing agreement of the social media site, or directly from the user that generated the data.

As described herein, a level of compliance for storing social media in compliance with different countries' laws can potentially be increased by storing consent configuration rules for multiple countries, determining a country associated with collected social media data, using the consent configuration rules to determine a storage format in compliance with the associated country's laws, and storing the social media data in the storage format specified by the consent configuration rules. The content of the stored social media data can then be analyzed by a downstream application, such as a social media analytics program to discern user sentiments associated with the search term. However, the country associated with collected social media data may not match any of the stored consent configuration rules. In this case, the collected social media data can be quarantined from downstream applications that can analyze contents of the collected social media. For example, the collected social media data can be physically isolated from the stored social media data associated with a country having a matching consent rule. As another example, the collected social media data can be stored in a locked format so that the collected social media data is not accessible to downstream applications. In other words, the downstream applications can be denied read permission of the quarantined social media data. If the consent configuration rules are updated to include a rule for the country associated with the quarantined social media data, the quarantined social media data can be reformatted and/or moved to a different storage location so that downstream applications can read the contents of the social media data.

Example System Implementing Consent Handling During Data Harvesting

FIG. 1 is a block diagram of an example system 100 implementing consent handling during data harvesting. The system 100 can include one or more server computers 110 for executing one or more data harvesting programs (e.g., data harvesters 111-113), storage for persisting consent rules 120, and storage 130 for persisting collected user-generated data, such as social media data. The storage 130 can include one or more physically distinct storage devices, where respective storage devices can provide different read, write, and/or modify permissions to different users, services, and/or applications. The storage 130 can include one or more quarantine storage devices and one or more non-quarantine storage devices. The non-quarantine storage devices can be used to store data that is accessible by various downstream applications. However, the quarantine storage devices may have limited access. For example, the access may be limited to only a data classifier 115 service or to an administrator of the system 100. The non-quarantine storage device(s) can include anonymized data 131 and non-anonymized data 132, for example. The quarantine storage device(s) can include the quarantined data 133, for example. The storage 120, 130 can include non-volatile memory, magnetic disks, direct-attached storage, network-attached storage (NAS), storage area networks (SAN), redundant arrays of independent disks (RAID), magnetic tapes or cassettes, DVDs, or any other medium which can be used to store information in a non-transitory way and which can be accessed by the server computers 110.

The data harvesters 111-113 can receive one or more search queries 140 and can collect user-generated data associated with the search queries 140. The search queries 140 can include one or more search terms and/or connectors, one or more information channels from which to gather data, a time or data range, an expiration date, and/or a ceiling on the amount of data to collect. The user-generated data can include posts to social media platforms, comments to articles posted at a network address, blog entries, or the like. The respective data harvesters 111-113 can be adapted to collect data from the one or more information channels. An information channel can be associated with one or more of a network address or web-site, a country, a range of network addresses, a web service, or the like.

As one example, the data harvester 111 can be adapted to collect user-generated data 152 from one or more server computers 150. In particular, the data harvester 111 can send Hyper-Text Transfer Protocol (HTTP) requests to an Internet Protocol (IP) address associated with the server computers 150 and the user-generated data 152 can be returned in HTTP responses. The data harvester 111 can process the collected user-generated data 152. For example, the data harvester 111 can filter the HTTP response data so that only information associated with a given search term is retained. As another example, the user-generated data 152 can be unstructured data and the data harvester 111 can format the unstructured data into different fields. The data harvester 111 can annotate the collected user-generated data 152 with additional fields to indicate various aspects associated with the collection of the data. For example, fields can be added to indicate: a country code associated with the country where the user-generated data 152 was collected from; a channel identifier to indicate a web-site where the user-generated data 152 was collected from; a retrieval mode identifier to indicate which data harvester collected the user-generated data 152; a time-stamp to indicate when the data was collected and/or posted; or the like. Thus, the data harvester 111 can harvest unstructured data and reformat the data into a unified structured format. A unified structured format can include a plurality of predefined fields so that all collected data can have the same fields and can be analyzed in a similar manner. Missing information for a field can be represented with a null value. As another example, the data harvester 112 can be adapted to collect only social media posts 162 from one or more server computers 160. The server computers 160 can be associated with an IP address that is different from the IP address associated with the server computers 150.

As another example, the data harvester 113 can be adapted to collect social media data using a social media retrieval service 172 executing on one or more server computers 170. The social media retrieval service 172 can be used to query the pages of one or more social media platforms and to provide social media data matching the query in a structured format. For example, the social media retrieval service 172 can be integrated within a single social media platform. As another example, the social media retrieval service 172 can be provided by a third party, and can be used to retrieve social media from multiple social media platforms.

The social media data can be pushed by or pulled from the social media retrieval service 172 using an Application Programming Interface (API) of the social media retrieval service 172. As a specific example, the data harvester 113 can establish a connection with the social media retrieval service 172. A request can be sent to the social media retrieval service 172. For example, the request can include a search term, an identifier associated with a previous request, and/or credentials for accessing the social media retrieval service 172. The social media retrieval service 172 can generate a stream identifier associated with the request and transmit the stream identifier to the data harvester 113. In one embodiment, the social media retrieval service 172 can push data to the data harvester 113. For example, data matching the search criteria can be transmitted to the data harvester 113 periodically or when a given number of data entries have been harvested. The transmitted data can be identified using the stream identifier. In an alternative embodiment, the data harvester 113 can poll the social media retrieval service 172 using the stream identifier so that data can be pulled from the social media retrieval service 172. In particular, the data can be transmitted from the social media retrieval service 172 in response to a specific request from the data harvester 113.

The collected user-generated data from the data harvesters 111-113 can be processed and classified by the data classifier 115. For example, the data classifier 115 can be software executing on the server computers 110. The data classifier 115 can use the consent rules 120 to determine how to process and store the collected user-generated data. For example, the respective consent rules 120 can specify a format for storing data associated with at least a user identifier, a respective country code, a social media channel, and/or a retrieval method. The data classifier 115 can convert the collected user-generated data into the specified format for storage. The consent rules 120 can be applied to one or more fields of the collected user-generated data using various logical operations. For example, a consent rule can correspond to a given retrieval mode and social media channel. As a specific example, a consent rule can specify a storage format for social media data collected from the social media channel FACEBOOK using the social media retrieval service DATASIFT. Thus, any social media data collected from FACEBOOK using DATASIFT will match the consent rule. As another example, a consent rule can correspond to a given retrieval mode, social media channel, and country code. As a specific example, a consent rule can apply to social media data collected from Great Britain from the social media channel FACEBOOK using the social media retrieval service DATASIFT. Thus, any social media data collected from Great Britain from FACEBOOK using DATASIFT will match the consent rule. The consent rules 120 can be applied in a prioritized order to classify each block of user-generated data associated with a different user. For example, consent rules corresponding to a user can be applied before consent rules corresponding to a country code and/or a social media channel. As another example, a consent rule matching more fields can be applied before a consent rule matching fewer fields of the collected user-generated data.

Thus, a consent rule can comprise an exemplar retrieval mode, an exemplar social media channel, and a resulting storage format. Collected user data coming from a data harvester can be matched against the exemplar retrieval mode and exemplar social media channel for a given rule. If there is a match, the data is stored in the resulting storage format of the given rule. Retrieval modes can be represented by retrieval mode identifiers, social media channels can be represented by social media channel identifiers, and storage formats can be represented by storage format identifiers. Such an arrangement allows one to easily add additional retrieval modes, social media channels, or storage formats without having to re-code the implementation.

As a specific example, the consent rules 120 can include a "white-list" of users that have provided explicit consent to have their data analyzed. The white-list can include users within the collector's organization, users that have provided consent through terms and conditions of using a social media platform, and users that have provided consent directly to the collector's organization, for example. The consent rules 120 can include a "black-list" of users that have explicitly withheld or withdrawn consent to have their data analyzed. The black-list can also include users that provide less useful information, such as spammers, for example. Each block can be classified according to the whether the user identifier associated with the block matches any of the user identifiers included within the white list or the black list. When the user identifier does not match any of the user identifiers on the white list or the black list, consent rules 120 corresponding to the other fields of the user-generated data, such as the country code, the social media channel, and/or the retrieval method can be used to classify the user-generated data. For example, a country may have no restrictions on using harvested data, may allow the use of anonymized harvested data, or may require explicit user consent to use the harvested data. As another example, a social media channel (e.g., a website) where user-generated data is posted may have terms and conditions that require the user to consent to having his or her data harvested and analyzed. As another example, the retrieval method (e.g., the data harvesters 111-113) may handle one or more aspects of the consent handling, such as when a social media retrieval service pre-filters data according to user settings.

Generally, the collected user-generated data for a particular user can be stored in a record or row of a relational database. The relational database can include the storage 130, for example. The fields of the collected user-generated data can be stored as columns within the row of the relational database. The number and types of fields for the rows can be predefined and can be the same for each record. However, the amount and type of data collected from different respective users may be different. For example, a first piece of collected user-generated data may include the user's name and age, but a second piece of collected user-generated data may include only the user's name. Thus the second piece of collected user-generated data is missing information related to age. Missing or removed information can be represented by using a null value in the corresponding field of the record.

The consent rules 120 can specify a format for storing the collected user-generated data. For example, the consent rules 120 can specify that the collected user-generated data is to be stored as anonymized data 131 or non-anonymized data 132. The anonymized data 131 can be user-generated data that has one or more aspects of user-identifying information removed from the data before it is stored. For example, the user-identifying information can include a user identifier, a name, an email address, a login name or alias, a phone number, a physical address, a gender, a birthdate or age, a marital status, a government identifier number (such as a social security number), and/or an account number. The consent rules 120 can specify which fields to remove (e.g., the fields in which to store a null value) when the collected user-generated data is to be stored as anonymized data 131. The user-identifying information can be extracted from the collected user-generated data and stored separately as user-identifying data 134. For example, email addresses, user names, and/or phone numbers can be stored as user-identifying data 134. The user-identifying data 134 can be used to generate mailing lists or phone lists, so that consent of the users can be requested, for example.

When there are no matching consent rules 120 corresponding to the collected user-generated data, the collected user-generated data can be stored as quarantined data 133. For example, the quarantined data 133 can be stored in a physically separate storage device than the anonymized data 131 and the non-anonymized data 132. As another example, the quarantined data 133 can be stored in a locked format, such as by being encrypted. Services and/or applications that are used for analyzing user-generated data can be denied access to the quarantined data 133, such as by being denied read permission or network access to the quarantined data 133, or by not having access to an encryption key for decrypting encrypted quarantined data 133. Storing the user-generated data in the quarantined or locked format can include blocking access to the social media data when there is no matching consent configuration rule. The access can be blocked for all services and applications that can access the storage 130 or for only a particular downstream application. By blocking access to the quarantined data 133, user sentiment associated with the collected user-generated data is not retrievable until the quarantined data 133 is unlocked or removed from quarantine. For example, the quarantined data 133 can be unlocked when a matching consent rule is created. As a specific example, user-generated data can be collected for a given country code that has no corresponding consent rule defined for the given country code. The collected user-generated data can be stored in a locked format. If, at a later time, a consent rule is created that corresponds to the given country code, the collected user-generated data can be unlocked so that applications can analyze the user sentiment associated with the collected user-generated data. Storing the user-generated data in the locked format can include transmitting a notification comprising the country code or the user identifier associated with the user-generated data. For example, the notification can be an email or Short Message Service (SMS) message sent to an administrator of the system 100. Thus, the administrator can be made aware that there is locked data, and the administrator can potentially create a new consent rule to unlock the data.

Example Dataflow Diagram for Consent Handling During Data Harvesting

Figure 2:
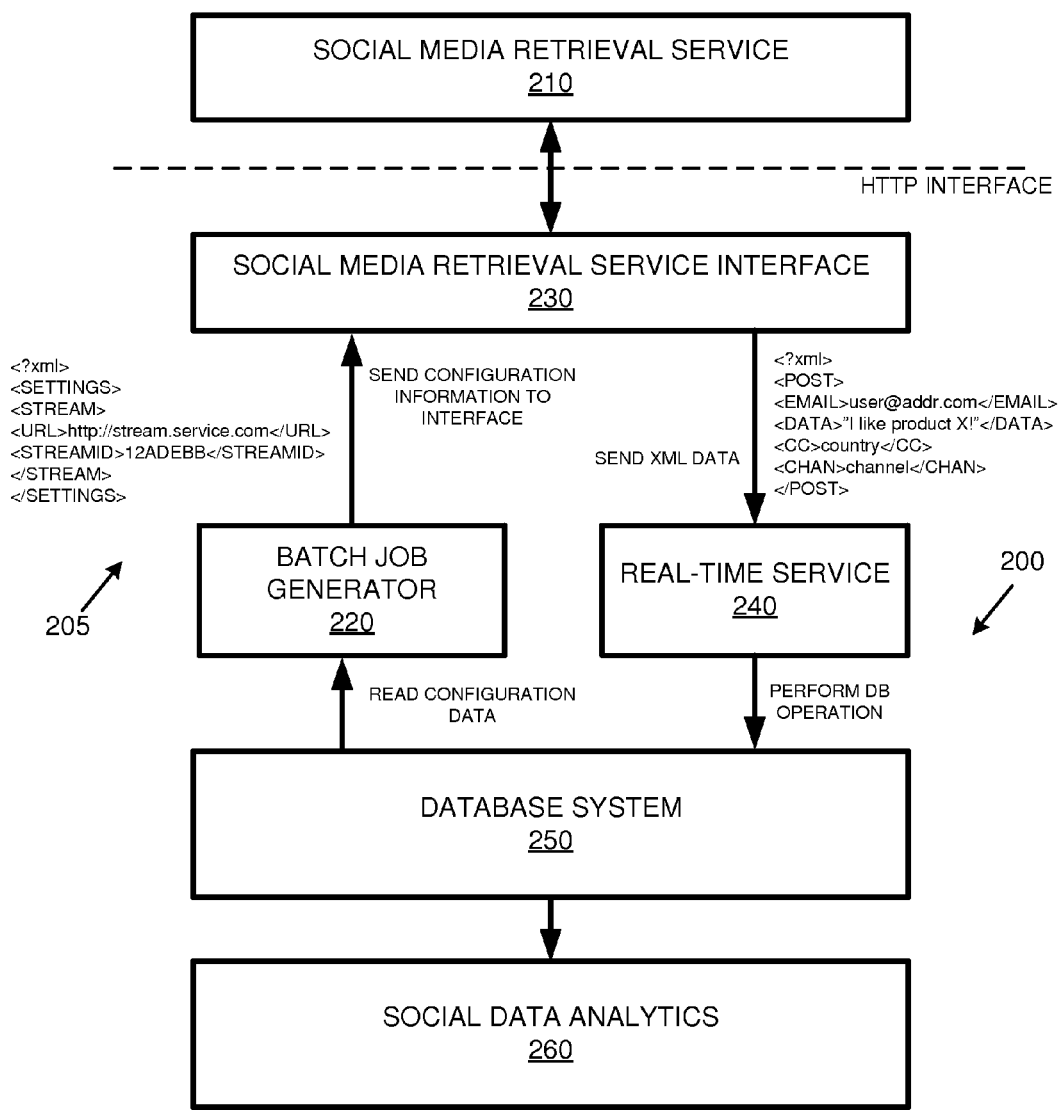
FIG. 2 is an example dataflow diagram for consent handling during data harvesting.

FIG. 2 is an example dataflow diagram for consent handling during data harvesting. In particular, a system 200 for harvesting and analyzing social media data can communicate with a social media retrieval service 210 over an HTTP interface. The system 200 can include a data harvesting module or service 205, a database system 250, and social data analytics 260. For example, the data harvesting module or service 205 can be used to manage the collection of social media data, such as formatting requests, receiving asynchronous communications, and formatting social media data for downstream services or applications. In one embodiment, the data harvesting module or service 205 can include a batch job generator 220, a social media retrieval service interface 230, and a real-time service 240.

The database system 250 (e.g., a database management system and the like) can be used as a repository for the storage of consent rules, queries, and transformation rules. For example, the repository can include a set of tables that hold user-created and predefined system objects, source and target metadata, and transformation rules. A user of the system 200 can submit a query using the database system 250. The query can be submitted directly through a user interface of the database system 250 or indirectly using a call from the social data analytics 260. The query can include a search term, a retrieval mode, and one or more social media channels. The query can be processed to generate configuration data for a batch job generator 220. The configuration data can include information specific to the query, such as one or more search terms, and information specific to the retrieval mode and/or a subscriber of the retrieval service. As one example, the query can be queued by the database system 250 so that the query can be launched when resources of the system 200 (e.g., the batch job generator 220) are available.

The batch job generator 220 can be used to initiate harvesting of social media data when the query is read from the head of the queue. In particular, the batch job generator 220 can read the configuration data associated with the query and format the configuration data for consumption by an interface for harvesting social media data (such as a social media retrieval service interface 230). For example, the configuration data can be sent as an eXtensible Markup Language (XML) document containing elements and attributes specifying information for initiating harvesting of social media using the social media retrieval service 210. As a specific example, the XML document can include a Uniform Resource Locator (URL) associated with the social media retrieval service 210, a stream identifier, credentials for accessing the social media retrieval service 210, and/or settings related to one or more aspects of using the social media retrieval service 210.

The social media retrieval service interface 230 can be used for communication between the data harvesting module or service. For example, the social media retrieval service interface 230 can establish a connection to the social media retrieval service 210, transmit HTTP requests to the social media retrieval service 210, and receive social media data from the social media retrieval service 210. As one example, the social media retrieval service interface 230 can poll the social media retrieval service 210 to determine if social media data is ready to be downloaded. As another example, the social media retrieval service interface 230 can receive a message containing social media data from the social media retrieval service 210. The message can include a stream identifier so that the social media retrieval service interface 230 can associate the collected data to the query that requested the data. For example, the social media data can be returned in a JavaScript Object Notation (JSON) format. The social media retrieval service interface 230 can parse the JSON data into different data fields. Fields can be added to indicate additional information related to different aspects associated with the data query and/or the collection of the data. The fields can reformatted as data within an XML document. The XML document can be communicated to the real-time service 240.

The real-time service 240 can transform the XML data and push the social media data into data models of the database system 250. The database system 250 can include a data store for storing the collected social media data according to the consent rules. For example, the social media data can be formatted in an anonymous, non-anonymous, or locked format based on the format specified by a matching consent rule. If there is no matching consent rule, the social media data can be formatted in the locked format. The data store can provide a connection to downstream applications, such as the social data analytics 260, and backend databases. Thus, a connection can be created between data services and web services.

Example of Collected Social Media Data

Figure 3:
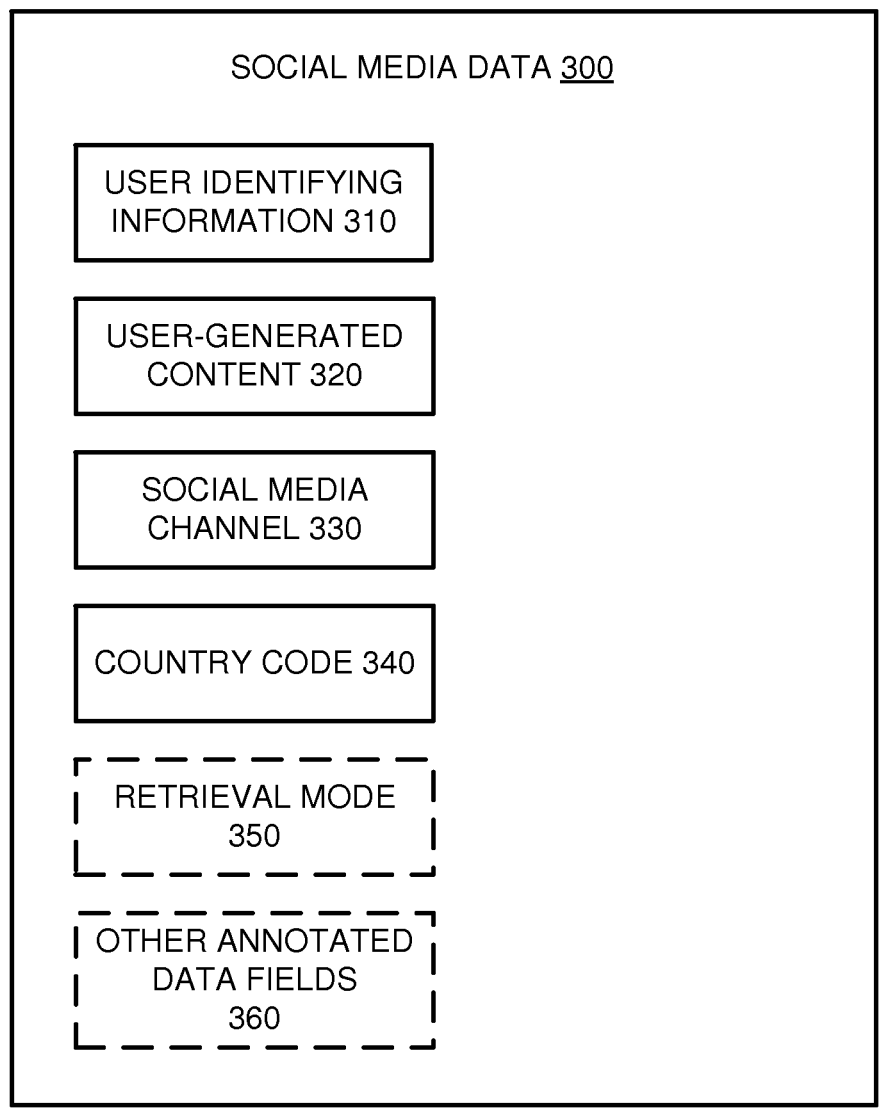
FIG. 3 is a block diagram of an example of collected social media data.

FIG. 3 is a block diagram of an example of collected social media data 300. The social media data 300 can include content that is associated with an identity of a user, content that is generated by the user, content that can be derived from the social media channel, and content that is associated with the collection of the data.

Content that is associated with an identity of a user can include user identifying information 310, for example. The user identifying information 310 can include a user identifier, a name, an email address, a login name or alias, a phone number, a physical address, a gender, a birthdate or age, a marital status, a government identifier number (such as a social security number), an occupation, an image of the user, a homepage, an image of an avatar of the user, and/or an account number. Anonymizing social media data can include removing all or some of the user identifying information 310 from the data. Non-anonymous social data can include keeping all or some of the user identifying information 310 present in the original post. For example, redundant, contradictory, or immaterial information can be removed. The non-anonymous social data can include annotating additional information to the user identifying information 310. For example, a database of user identifying information can be maintained, and missing fields of the user identifying information 310 can potentially be added by searching the database using known fields of the user identifying information 310. Thus, the user identifying information 310 can include information that is obtained from content that is generated by the user, content that is derived from the social media channel, and/or content that is obtained externally from the social media channel (such as by a database of users).

Content that is generated by the user can include user-generated content 320, for example. The user-generated content 320 can include text, audio, video, hyperlinks, status or sentiment indicators (such as likes and dislikes), and tags indicating a subject-matter of the content. The user-generated content 320 can be modified, edited, and/or annotated prior to storage. For example, a video or audio file can be transcribed using automated methods to reduce the storage size and to potentially make the content easier to analyze. As another example, sentiments can be mined from user-generated text. In particular, different keywords and/or punctuation can be assigned different values to indicate a level of user sentiment. The sentiment level can be added to the user-generated content 320.

Content that can be derived from the social media channel can include a social media channel identifier 330 and a country code 340, for example. The social media channel identifier 330 can identify which social media channel the information was obtained from. The country code 340 can indicate the country where the user-generated data was created or the country where the user registered to use the social media platform, for example. As a specific example, the country code can be encoded as the two-character International Organization for Standardization (ISO) code in accordance with ISO 3166. Other content that may be derived from the social media channel include a language of the content, a channel identifier associated with the content, a creation time, a type associated with the content, a URL associated with the content, a number of views of the content, a number of positive votes for the content, a number of negative votes for the content, a number of contacts associated with the user, a popularity rank of the user, and a location, latitude, and/or longitude associated with the content.

Content that is associated with the collection of the data can include a retrieval mode 350, a retrieval timestamp, a query identifier, a user associated with a query, a status of the data (such as locked, anonymized, or non-anonymized), a stream identifier, and one or more search terms, for example. The retrieval mode 350 can indicate which data harvester of a plurality of data harvesters were used to collect the data. Other annotated data fields 360 can be any information related to the user, social media channel, collection, identification, and/or analysis of the social media data 300. For example, the other annotated data fields 360 can be added by the data harvester, database system, and/or social data analytics engine.

Example Methods for Managing User Consent During Data Harvesting

Figure 4:
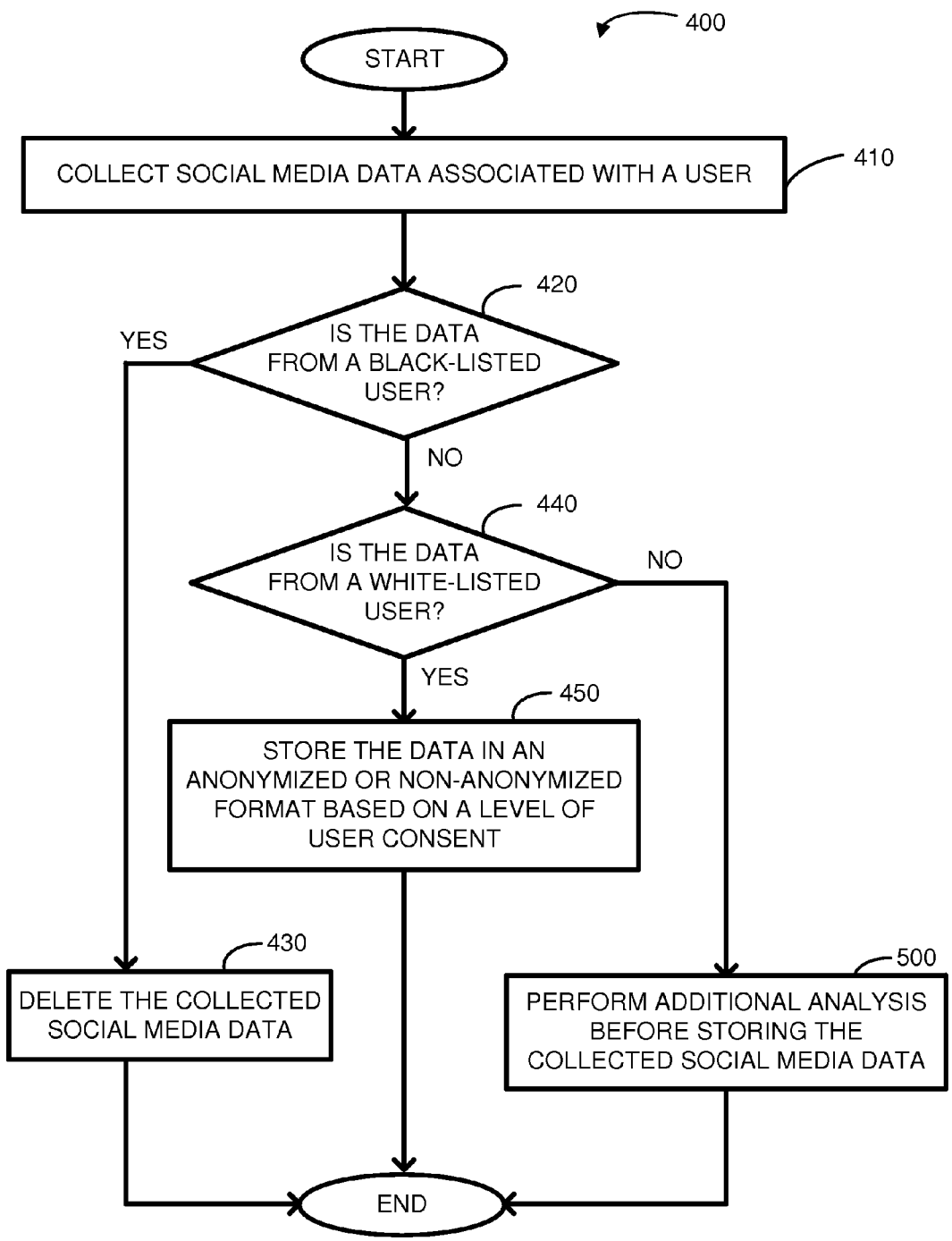
FIGS. 4-5 are flow charts illustrating various example methods for managing user consent during data harvesting.
Figure 5:
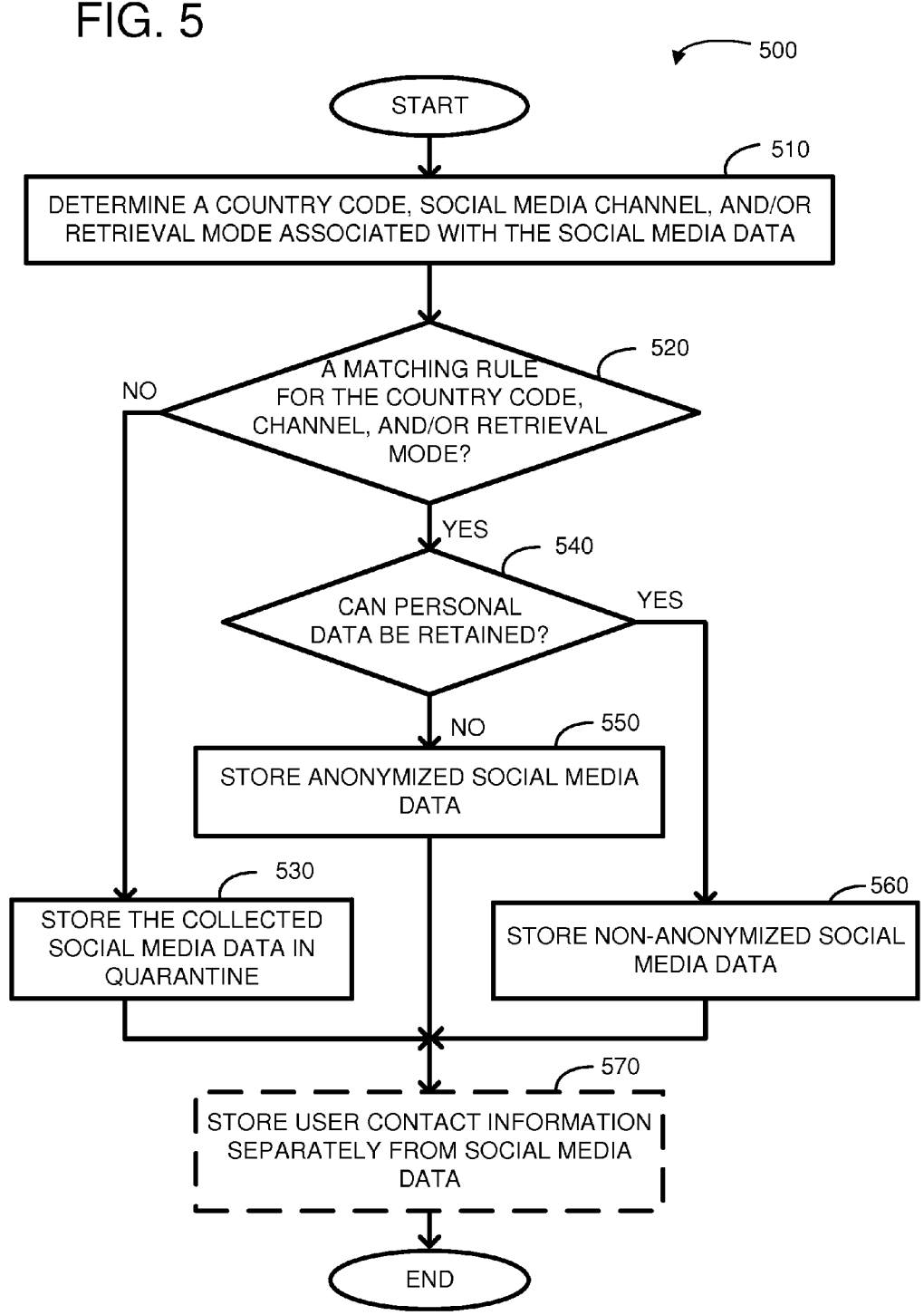

FIGS. 4-5 are flow charts illustrating various example methods for managing user consent during data harvesting. Specifically, FIG. 4 is a flow chart illustrating an example method 400 for managing user consent during data harvesting.

At 410, social media data associated with a user is collected. For example, the social media data can be collected using a data harvesting program, such as data harvesters 111-113. The data harvesting program can collect the social media data by crawling pages associated with a social media channel, or the data harvesting program can collect the social media data by using a social media retrieval service, for example. Collecting the social media data can include parsing the social media data and dividing the data into different fields and annotating the social media data with additional information.

At 420, it can be determined whether the user associated with the social media data is on a black-list of users. For example, the black-list of users can include users that have explicitly withheld or withdrawn consent to have their data analyzed. If the user associated with the social media data is on the black-list of users, then at 430, the collected social media data can be deleted. If the user associated with the social media data is not on the black-list of users, then at 440, it can be determined whether the user associated with the social media data is on a white-list of users. For example, the white-list of users can include users that have provided explicit consent to have their data analyzed.

If the user associated with the social media data is on the white-list of users, then at 450, the collected social media data can be stored in an anonymized on non-anonymized format based on a level of user consent. For example, a consent level can be associated with a respective user on the white list of users. The consent level can indicate whether to store collected social media data associated with the user in an anonymous or non-anonymous format. The level of consent can be explicitly provided by the user or may be derived from a user agreement or laws of a country where the social media data was generated. In an alternative embodiment, if the user associated with the social media data is on the white-list of users, then the collected social media data can always be stored in a non-anonymized format.

If the user associated with the social media data is not on the black-list or the white-list of users, then at 500, an additional analysis can be performed before storing the collected social media data. In one embodiment, the comparison to the white-list and/or the additional analysis can be optional. For example, a setting can be provided to enable or disable the additional analysis. By disabling the additional analysis, the overhead of the processing of social media data can be reduced. When the additional analysis is disabled, the social media data can be stored in an anonymous or non-anonymous format.

FIG. 5 is a flow chart illustrating an example method 500 for performing the additional analysis. At 510, a country code, social media channel, and/or retrieval mode associated with the social media data can be determined. At 520, it can be determined whether there is a matching consent rule for the country code, social media channel, and/or retrieval mode. A consent rule matches when value(s) of a country code, social media channel, and/or retrieval mode associated with the consent rule match values of corresponding fields of the social media data. The consent rules can be prioritized so that only one consent rule is selected when multiple consent rules match. As one example, consent rules for countries can be prioritized over consent rules for social media channels. The consent rules can be associated with multiple fields of the social media data. For example a consent rule can be associated with all of a given country code, social media channel, and retrieval mode. As another example, a consent rule can be associated with a given country code and social media channel.

When there is no matching consent rule, at 530, the collected social media data can be stored in quarantine. Storing the collected social media data in quarantine can include storing the quarantined data in a limited-access physically separate storage device and/or storing the quarantined data in a locked format. For example, storing the user-generated data in quarantine can include blocking access to the social media data from one or more downstream services and/or applications. By blocking access to the locked data, the user identifying information and user-generated content associated with the collected social media data is not retrievable until the locked data is unlocked. For example, the locked data can be unlocked when a matching consent rule is created. Storing the social media data in quarantine can include writing to a log file and/or transmitting a notification comprising the country code or the user identifier associated with the user-generated data. Thus, the administrator can be made aware that there is locked data, and the administrator can create a new consent rule to unlock the data.

When there is a matching consent rule, at 540, it can be determined whether personal data associated with the collected social media data can be retained. For example, the matching consent rule can specify whether to anonymize the data or whether to store the data non-anonymized.

When the matching consent rule specifies personal data cannot be retained, at 550, anonymized social media data can be stored. The matching consent rule can specify how to anonymize the data, such as by indicating which fields of the data to delete before storing the data.

When the matching consent rule specifies personal data can be retained, at 560, non-anonymized social media data can be stored. The personal data can be obtained from the original collected social media data and/or annotated with personal data obtained from other databases, for example.

At 570, user contact information associated with the social media data can optionally be stored separately from the social media data. By separating the social media data from the user contact information, the sentiments of the user can be hidden. The user contact information can potentially be used to request explicit consent from the user to analyze his or her data. Thus, the user can potentially be added to the black-list or the white list depending on the user's response.

Example Method for Processing a Request for Social Media Data

Figure 6:
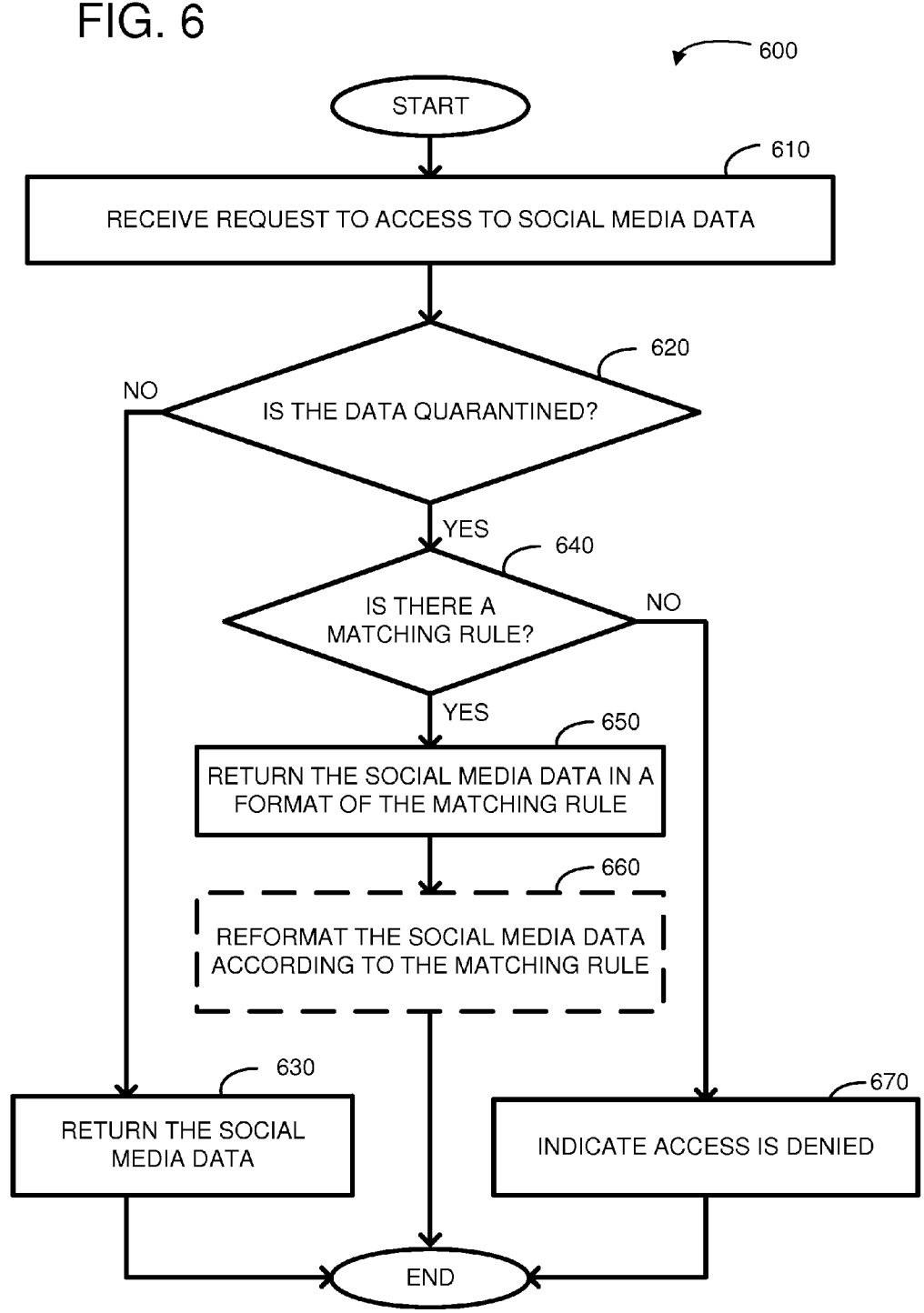
FIG. 6 is a flow chart illustrating an example method for processing a request for social media data.

FIG. 6 is a flow chart illustrating an example method 600 for processing a request for social media data. For example, the request can be from a downstream application, such as a social media data analytics service. As another example, the request can be in response to adding a new consent rule so that previously quarantined data matching the new consent rule can be made available to applications that may use the data. The request can include one or more search terms and fields for identifying the desired social media data. The request can include which fields to return in a response.

When social media data matching the request is present, at 620, it can be determined whether the social media data is quarantined. For example, it can be determined whether the social media data is stored in a locked format. When the social media data is not quarantined, at 630, the social media data can be returned. All fields of the social media data can be returned or a subset of the fields of the social media data can be returned, based on the requested information. When the social media data is quarantined, at 640, it can be determined whether there is a matching consent rule corresponding to the social media data. For example, a matching consent rule may have been added after the social media data was collected and stored in quarantine. As one example, a matching consent rule may have been added for the country code, social media channel, and/or retrieval mode. As another example, the user associated with the quarantined social media data may have been added to the white-list.

At 650, when there is a matching consent rule corresponding to the social media data, one or more fields of the social media data can be returned in a format according to the matching rule. For example, the matching rule may specify that the social media data is to be anonymized. Thus, user-identifying information can be removed when returning the formatted social media data to the requestor. At 660, the record corresponding to the social media data can optionally be moved and/or reformatted according to the matching consent rule. For example, quarantined data stored in a storage device separate from non-quarantined data can be extracted from the storage device associated with quarantined data, and stored on the storage device associated with non-quarantined data. Extracting the quarantined data can include decrypting the quarantined data and generating a new data file by copying the unencrypted data into the new data file. The previously quarantined data can be deleted from the quarantine storage device. Thus, the record can be updated to reflect the current state of the consent rule and a conversion can be skipped the next time that the record is accessed.

At 670, when the social media data is locked and there is no matching consent rule, access to the social media data is denied and an indication of the denial can be sent to the requestor. For example, a response including an error code can be sent to the requestor. Thus, the access to the collected social media data is blocked and the user sentiment contained within the collected social media data is not retrievable until a matching consent rule is created.

Additional Example Method for Managing User Consent During Data Harvesting

Figure 7:
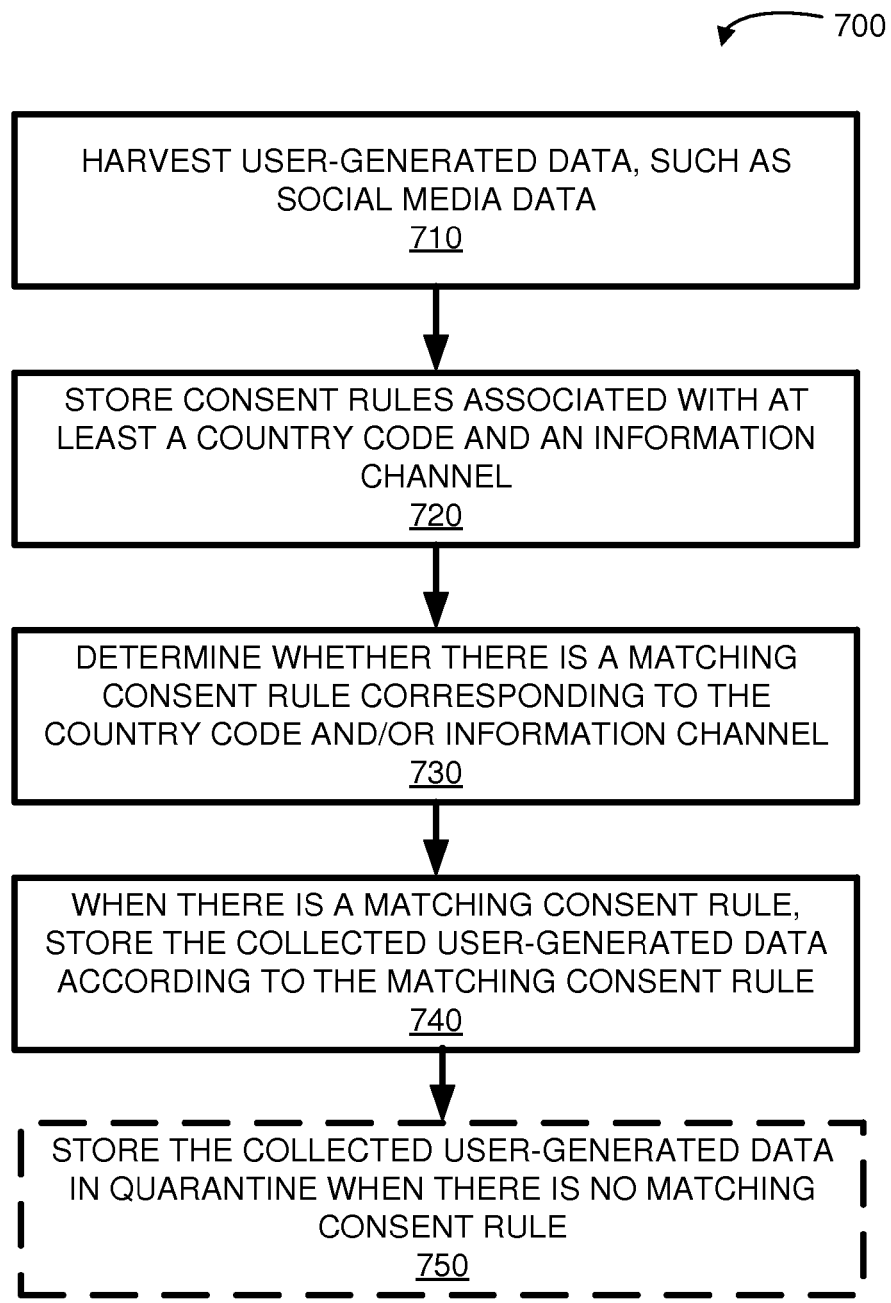
FIG. 7 is a flow chart illustrating an example method for managing user consent during data harvesting.

FIG. 7 is a flow chart illustrating an example method 700 for managing user consent during data harvesting. At 710, user-generated data, such as social media data, is harvested. For example, one or more data harvesting programs (such as data harvesters 111-113, 205) can be used to collect structured or unstructured social media data from various social media platforms. The data can be harvested according to a query comprising various search criteria, for example. The social media data can be divided into a plurality of fields including fields representative of a user identifier, a country code, and/or a social media channel. The social media data can be annotated with additional fields representative of content that is associated with the identity of a user, content that can be derived from the social media channel, and content that is associated with the collection of the data, for example.

At 720, consent rules associated with a country code and/or an information channel can be stored. The information channel can be a social media channel, for example. The respective consent rules can specify a format for storing data associated with at least a respective country code or a respective information channel. For example, the specified formats can include an anonymous format, a non-anonymous format, and a locked format. When the anonymous format is used, fields to exclude (e.g., fields where null values are stored) can be specified by the consent rule. Thus, an author of the consent rule can potentially make a determination as to which fields are to be excluded when anonymizing the user-generated data. Furthermore, the anonymization can be tuned on a country-by-country basis.

At 730, it can be determined whether there is a matching consent rule corresponding to the country code and/or information channel of the harvested user-generated data. For example, consent rules can be stored for Russia (e.g., the country code is RU) and for Great Britain (e.g., the country code is GB). If the user-generated data is harvested from a web-site operating from Russia with Russian users, the Russian consent rule will match and the Great Britain consent rule will not match. If the user-generated data is harvested from a web-site operating from Australia with Australian users, neither the Russian consent rule nor the Great Britain consent rule will match.

At 740, when there is a matching consent rule, the collected user-generated data can be stored according to the matching consent rule. For example, the consent rule for Russia can specify to store the harvested user-generated data in an anonymous format. Thus, when user-generated data is harvested from a Russian user, all of the user-identifiable fields can be removed from the harvested user-generated data as it is stored. Alternatively, the consent rule for Russia can specify specific fields to remove, such as a name, an address, and a telephone number. In this example, other fields, such as gender, age, and an email address can be retained while the name, address, and telephone number fields are removed.

At 750, the collected user-generated data can be stored in a quarantine when there is no matching consent rule. Storing the user-generated data in the quarantine can include blocking access to the user-generated data when there is no matching consent rule. For example, the user-generated data can be stored in a limited-access storage device and/or the user-generated data can be encoded or encrypted in a locked format that is only readable by a limited number of applications. For example, access to the collected user-generated data by a downstream application, such as a data analytics program, can be blocked. Storing the user-generated data in the quarantine can include logging information and/or transmitting a notification comprising the country code or the user identifier associated with the user-generated data. For example, if Australian user-generated data is collected and there is no matching consent rule, the Australian user-generated data can be stored in a quarantine and a notification to an administrator can indicate that Australian data has been collected and quarantined. Thus, the administrator can generate a consent rule for the Australia country code so that the Australian data can be removed from the quarantine.

Example Computing Environment

Figure 8:
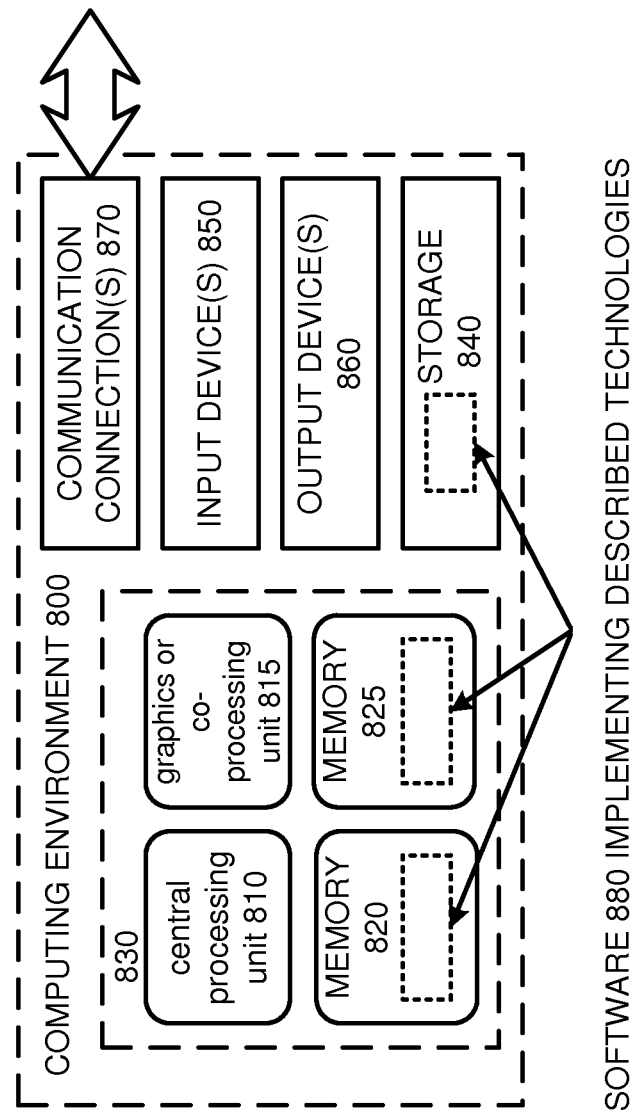
FIG. 8 is a diagram of an example computing system in which described embodiments can be implemented.

FIG. 8 depicts a generalized example of a suitable computing environment (e.g., computing system) 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. For example, the rules engine and others described herein can be the software 880 executed from the memory 820.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. One or more computer-readable storage media comprising computer-executable instructions for a processor, that when executed, cause the processor to:
receive social media data associated with a user identifier and a first country code;
store a consent configuration rule specifying whether to store the social media data anonymously or non-anonymously, the consent configuration rule associated with a second country code;
determine whether the second country code associated with the consent configuration rule matches the first country code associated with the social media data;
store the social media data in a quarantine when the second country code associated with the consent configuration rule does not match the first country code associated with the social media data;
determine whether the user identifier is on a white-list and store the social media data in non-quarantine storage when the user identifier is on the white-list; and
determine whether the user identifier is on a black-list and delete the social media data when the user identifier is on the black-list.

2. The one or more computer-readable storage media of claim 1, further comprising computer-executable instructions for the processor, that when executed, cause the processor to:
when the second country code associated with the consent configuration rule matches the first country code associated with the social media data, store the social media data according to the consent configuration rule.

3. The one or more computer-readable storage media of claim 2, wherein the consent configuration rule specifies storing the social media data anonymously, and storing the social media data anonymously comprises removing the user identifier from the stored social media data.

4. The one or more computer-readable storage media of claim 1, wherein storing the social media data in the quarantine comprises blocking access to the social media data when the second country code associated with the consent configuration rule does not match the first country code associated with the social media data.

5. The one or more computer-readable storage media of claim 1, wherein storing the social media data in the quarantine comprises transmitting a notification comprising the first country code associated with the social media data.

6. The one or more computer-readable storage media of claim 1, further comprising computer-executable instructions for the processor, that when executed, cause the processor to:
unlock the social media data stored in the quarantine in response to adding a new consent configuration rule associated with a third country code that matches the first country code associated with the social media data stored in the quarantine.

7. The one or more computer-readable storage media of claim 1, further comprising computer-executable instructions for the processor, that when executed, cause the processor to:
transmit a request comprising a stream identifier associated with one or more search terms to a social media retrieval service, and wherein the received social media data is associated with at least the stream identifier.

8. A method implemented at least in part by a computing system, the method comprising:
harvesting social media data to generate harvested social media data, the harvested social media data comprising a social media channel, user identifying information, and a country code;
storing a plurality of consent rules, a respective consent rule specifying a format for storing data associated with at least a respective country code or a respective social media channel;
determining whether there is a matching consent rule of the plurality of consent rules corresponding to the social media channel or the country code of the harvested social media data;
when there is a matching consent rule, storing the harvested social media data in the format specified by the matching consent rule of the plurality of consent rules;
determining whether the user identified by the user identifying information is on a white-list and wherein the harvested social media data is stored in non-quarantine storage when the identified user is on the white-list; and
determining whether a user identified from the user identifying information is on a black-list and delete the harvested social media data when the identified user is on the black-list.

9. The method of claim 8, wherein the format for storing the data associated with at least the respective country code or the respective social media channel is anonymous, non-anonymous, or locked.

10. The method of claim 9, wherein the user identifying information of the harvested social media data is removed before storing the harvested social media data when the format specified by the matching consent rule is anonymous.

11. The method of claim 8, further comprising:
when there is no matching consent rule, storing the harvested social media data in a locked format so that user sentiment is not retrievable until a matching consent rule is created.

12. The method of claim 8, wherein harvesting social media data comprises transmitting one or more search terms to a social media retrieval service and receiving structured data from the social media retrieval service.

13. The method of claim 8, wherein harvesting social media data comprises retrieving unstructured data matching one or more search terms and formatting the unstructured data into a unified format.

14. The method of claim 8, wherein a respective consent rule of the plurality of consent rules specifies one or more fields to remove when anonymizing the social media data.

15. A system for consent handling during data harvesting, the system comprising:

a data harvester for collecting social media data, the collected social media data comprising one or more fields representative of a user identifier, a country code, or a social media channel;

a first storage device for storing a white list and a plurality of consent rules, a respective consent rule for matching a value of a given field of the collected social media data to a format for storing the social media data;

a non-quarantine storage device for storing collected social media data;

a quarantine storage device for storing collected social media data, the quarantine storage device physically separate from the non-quarantine storage device; and a database system in communication with the data harvester and the storage devices, the database system configured to:

determine whether the user identifier of the collected social media data is on the white-list and store the collected social media data in the non-quarantine storage when the user identifier is on the white-list;

determine whether the user identifier of the collected social media data is on a black-list and delete the collected social media data when the user identifier is on the black-list;

determine whether any of the plurality of consent rules match the value of the given field of the collected social media data;

when there is a match, store the collected social media data on the non-quarantine storage device in the format of the matching consent rule; and when there is no match, store the collected social media data on the quarantine storage device.

16. The system of claim 15, wherein the data harvester is configured to:

transmit a request comprising a stream identifier associated with one or more search terms to a social media retrieval service, and wherein the collected social media data is associated with at least the stream identifier.

17. The system of claim 15, wherein storing the collected social media data in the format of the matching consent rule comprises removing the user identifier from the collected social media data.

18. The system of claim 15, wherein storing the collected social media data on the quarantine storage device comprises storing the collected social media data in a locked format so that access to the collected social media data is blocked when there is no matching consent rule.

* * * * *